US012473180B2

(12) United States Patent
Weterings et al.

(10) Patent No.: US 12,473,180 B2
(45) Date of Patent: Nov. 18, 2025

(54) CRANE HOUSING, CRANE, JACK-UP VESSEL, METHOD

(71) Applicant: Itrec B.V., Schiedam (NL)

(72) Inventors: Hendrikus Jacobus Weterings, Schiedam (NL); Wing Sum Lee, Schiedam (NL)

(73) Assignee: ITREC B.V., Schiedam (NL)

(*) Notice: Subject to any disclaimer, the term of this patent is extended or adjusted under 35 U.S.C. 154(b) by 199 days.

(21) Appl. No.: 18/280,138

(22) PCT Filed: Mar. 1, 2022

(86) PCT No.: PCT/EP2022/055167
§ 371 (c)(1),
(2) Date: Sep. 1, 2023

(87) PCT Pub. No.: WO2022/184721
PCT Pub. Date: Sep. 9, 2022

(65) Prior Publication Data

US 2024/0067507 A1 Feb. 29, 2024

(30) Foreign Application Priority Data

Mar. 3, 2021 (NL) ...................................... 2027689

(51) Int. Cl.
*B66C 23/84* (2006.01)
*B66C 23/52* (2006.01)
*E02B 17/02* (2006.01)

(52) U.S. Cl.
CPC .............. *B66C 23/84* (2013.01); *B66C 23/52* (2013.01); *E02B 17/021* (2013.01)

(58) Field of Classification Search
CPC ......... B66C 23/84; B66C 23/86; B66C 23/52; B66C 23/525; B66C 23/62
See application file for complete search history.

(56) References Cited

U.S. PATENT DOCUMENTS 4,076,128 A * 2/1978 Tax ......................... B66C 23/84 212/195
4,582,205 A * 4/1986 Berger .................... B66C 13/52 212/175

(Continued)

FOREIGN PATENT DOCUMENTS

JP 63-22922 A 1/1988
WO WO 2016/156931 A1 10/2016

(Continued)

OTHER PUBLICATIONS

Dutch Search Report, issued in Priority Application No. 2027689, dated Nov. 18, 2021.

(Continued)

*Primary Examiner* — Anna M Momper
*Assistant Examiner* — Juan J Campos, Jr.
(74) *Attorney, Agent, or Firm* — Birch, Stewart, Kolasch & Birch, LLP

(57) ABSTRACT

A crane housing for a leg encircling crane to be mounted onto a slew bearing includes an annular base component, two support components, and a frontal component, each having bulkheads. The support components are connected to the annular base component at respective lateral sides of a front segment thereof. The frontal component is connected to the front segment of the annular base component, between the two support components such as to interconnect these. The two support components and the frontal component together form a front torsion box, which provides torsional rigidity. The load of the boom, as applied on the support components, subjects the base component via the torsion box to a torsion that is distributed over the front segment of the base component.

20 Claims, 3 Drawing Sheets

(56) References Cited

U.S. PATENT DOCUMENTS

| | | | | |
|---|---|---|---|---|
| 10,974,937 | B2 * | 4/2021 | Roodenburg | B66C 23/62 |
| 2007/0175849 | A1 * | 8/2007 | Yokoyama | B66C 23/82 212/180 |
| 2020/0031636 | A1 * | 1/2020 | Roodenburg | B66C 23/84 |

FOREIGN PATENT DOCUMENTS

| | | | |
|---|---|---|---|
| WO | WO 2018/052291 | A1 | 3/2018 |
| WO | WO 2018/143807 | A1 | 8/2018 |
| WO | WO 2018/143807 | A8 | 3/2019 |

OTHER PUBLICATIONS

International Search Report, issued in PCT/EP2022/055167, dated Jul. 12, 2022.

Written Opinion of the International Searching Authority, issued in PCT/EP2022/055167, dated Jul. 12, 2022.

* cited by examiner

CRANE HOUSING, CRANE, JACK-UP VESSEL, METHOD

FIELD OF THE INVENTION

The invention relates to a crane housing for a leg encircling crane, a leg encircling crane comprising the crane housing, and a jack-up vessel comprising the leg encircling crane.

In offshore hoisting operations on jack-up vessels, for example installation or maintenance of one or more wind turbine components, leg encircling cranes are often used. Because of their arrangement around a jack-up leg of the jack-up vessel, a leg encircling crane saves deck-space, compared to a deck-mounted crane.

A leg encircling crane is known to comprise a slew bearing which extends about a jack-up leg of the jack-up vessel. This slew bearing is fixed to the hull of the vessel—it is generally supported on a foot of the crane which is fixed to the hull. A crane housing of the crane extends about the jack-up leg and is supported by the slew bearing so as to be slewable relative to the hull of the vessel around a vertical slew axis. The crane housing structurally supports a pivotal boom and a superstructure of the crane.

The boom is pivotally mounted to the front of the crane housing via one or more boom supports on the crane housing, so that the boom is pivotal about a substantially horizontal pivot axis through the boom supports. Typically, the boom supports are provided directly above the slew bearing, such that they are vertically aligned with the slew bearing, and such that the load of the boom is transferred in a substantially vertical direction to the slew bearing.

It is common to provide two boom supports at equal lateral distances from a longitudinal center line of the crane housing through the slew axis and the longitudinal boom axis, so that the boom is supported by both boom supports. In particular, the boom may therein be an A-frame boom, wherein an inner end of each of the legs of the ‘A’ is supported by a respective boom support.

The crane superstructure is generally a crane gantry, which may be mounted to the back of the crane housing via one or more crane gantry supports. The crane gantry is provided diametrically opposite the boom so that the boom can be luffed up and down around the pivot axis via a luffing system on the crane gantry.

OBJECT OF THE INVENTION

The present invention aims to provide a crane housing which provides support of the crane boom that is improved relative to the known crane housings, or which at least forms an alternative to the known crane housings, in leg encircling cranes.

SUMMARY OF THE INVENTION

The invention provides a crane housing, which is a box-type construction. The crane housing is configured for a leg encircling crane, for use on a jack-up vessel comprising horizontally spaced apart jack-up legs. The crane housing is configured to be mounted onto a slew bearing extending about one of the jack-up legs of the jack up vessel, for allowing slew motion of the crane housing of the crane around a vertical slew axis, to support a crane boom at a front of the crane housing, and to support a crane superstructure, e.g. a crane gantry tension member, at a back of the crane housing.

The crane housing, the box-type construction, comprises an annular base component, configured to extend about a jack-up leg of the jack-up vessel. It has an inner circumferential wall, an outer circumferential wall, bulkheads extending between the inner circumferential wall and the outer circumferential wall, a top wall and preferably a bottom wall.

It further comprises bulkheads extending between the inner circumferential wall and the outer circumferential wall. As is known in the art, such bulkheads may extend in vertical planes to provide torsional rigidity to the annular base component. It is envisaged that the bulkheads extend radially with respect to the slew axis with angular spacing therebetween, for example divided evenly over the annular component in an angular direction.

According to the invention, the crane housing comprises two support components. Each support component is connected to the annular base component on a respective lateral side of a front segment of the annular base component. Thus, seen in a front view from the crane boom, i.e. along the longitudinal center line, there is a left support component and a right support component. The support components each have an outer wall that is at two ends attached to the outer wall of the base component. The support components furthermore each have a top wall and a bottom wall, and bulkheads extending between the outer wall of the support component and the outer circumferential wall of the annular base component.

According to the invention, the crane housing further comprises a frontal component. This frontal component is provided in front of the front segment of the base component and is connected thereto. It extends between the two support components, such as to interconnect the support components. The frontal component has a front wall that is at each of two ends thereof attached to the outer wall of a respective one of the support components. Thus, seen in a front view along the longitudinal center line, the front wall of the frontal component is at a left end thereof attached to the outer wall of the left support component, and at a right end thereof attached to the right support component. The frontal component further comprises a top wall and a bottom wall. Bulkheads are provided which extend between the front wall of the frontal component and the outer circumferential wall of the annular base component. It is envisaged that the bulkheads extend radially with respect to the slew axis with angular spacing there between, for example divided evenly over the annular component in an angular direction.

The crane housing is provided with two boom supports, each mounted on a respective support component, for pivotally supporting two inner ends of the boom, e.g. an A-frame boom, of the crane so that the boom is pivotal about a horizontal pivot axis through the two boom supports.

The two support components and the frontal component together form a front torsion box which provides torsional rigidity, such that the load of the boom, as applied on the boom supports, subjects the base component via the torsion box to a torsion that is distributed over the front segment of the base component.

Advantageously, by this arrangement of the base component and the support components, the boom supports are supported by the torsion box, more in particular by the support components of the torsion box, outwardly from the annular base component. As a result, the load of the boom, e.g. including the load of an object suspended therefrom, e.g. a wind turbine component, is exerted on the crane housing outwardly from the annular component. By providing the annular base component with a torsion box according to the invention, the load of the boom subjects the annular base component to a torsion outwardly downwardly and around a horizontal torsion axis. This may reduce disadvantageous material stresses in the annular component in shear directions, compared to known crane housings wherein the boom is supported further inwardly, in particular on an annular component itself.

Having the frontal component interconnect the support components in front of the front segment of the annular base component, results in the formation of a front torsion box adjacent, and along part of, the outer circumferential wall of the annular base component. The torsion box comprises the support components and the frontal component. This front torsion box forms an intermediate structure via which the load of the boom is transferred to the annular base component mainly as a torsion force. The load of the boom is initially distributed over the torsion box prior to the transfer of the load to the annular base component. The distributed load is transferred via the torsion box to the annular base component such as to distribute the exerted torsion over the front segment of the annular base component. Via the front segment, the load is distributed further backwards over the annular base component. The extension and connection of the torsion box along and to the front segment, and the initial load distribution over the torsion box prior to transfer of the load to the front segment, may reduce disadvantageous stress variations along the front segment.

In all, the inventive configuration may result in a more favorable material stress profile of the crane housing in response to the boom load, in terms of a more even distribution and reduced shear stress components.

In the context of the invention, a backwards direction refers to a horizontal direction from the boom towards the slew axis, and a forwards direction to an opposite direction. Longitudinal directions correspond to front-back directions. Lateral directions are directions perpendicular to longitudinal directions. Inward directions are directions towards the slew axis, e.g. radial directions relative to the slew axis, and outward directions are opposite thereto.

It is envisaged that the bulkheads of the annular component extend radially with respect to the slew axis, at least in the front segment of the annular component, for example, throughout the whole annular component. In addition, it is envisaged that the front wall of the frontal component runs substantially parallel to the outer wall of the frontal component.

In an embodiment, each support component comprises a front wall that is parallel to the boom pivot axis, and to multiple bulkheads of the support components. In a preferred embodiment, the front wall is furthermore in register with a bulkhead in the base component. This of the support components provides an optimal connection of the torsion box, and thus an optimal load transfer by the torsion box, to the annular base component.

Preferably the bulkheads of the support components extend parallel to the pivot axis of the boom when seen in a top view of the crane housing. Thus, with vertically extending bulkheads, the bulkheads extend in vertical planes parallel to the pivot axis, which are longitudinally spaced from each other. Providing the support components with multiple bulkheads that run parallel to the boom pivot axis, allows for an optimal load transfer from the boom supports to the annular base component. In a further preferred embodiment, the front wall of the support components, which is connected to the outer circumferential wall of the annular base component, is parallel to the boom pivot axis as well. This configuration of the support components provides an optimal connection of the torsion box, and thus an optimal load transfer by the torsion box, to the annular base component.

In an embodiment, the bulkheads of the support components are parallel to the boom pivot axis and are in register with bulkheads of the annular base component, located on the other side of the outer circumferential wall of the annular base component. In such an embodiment, the bulkheads of the support components extends outwardly from an outer end of a respective one of the bulkheads of the annular component. Thus, the inner end of the bulkheads of the support component practically adjoins the outer end of a respective bulkhead of the front segment via the outer circumferential wall of the annular base component in the front segment. The effect is that the associated bulkheads in the front segment may be considered to continue outward of the outer circumferential wall of the annular base component, in the support components. This may further contribute to a favourable tension on the front segment as the boom load is transferred thereto, and to the torsional rigidity of the entire structure of the base, support, and frontal component.

In an embodiment, each of the bulkheads of the frontal component are in register with the bulkheads of the annular base component, located on the other side of the outer circumferential wall of the annular base component. In such an embodiment, the bulkheads of the frontal component extend outwardly, e.g. radially, from an outer end of a respective one of the bulkheads of the annular base component in the front segment thereof. Thus, the inner end of each of the bulkheads of the frontal component practically adjoins the outer end of a respective bulkhead of the front segment via the outer circumferential wall of the annular base component in the front segment. The effect is that the associated bulkheads in the front segment may be considered to continue outwardly in the frontal component, interrupted by the outer circumferential wall of the annular base component. This may further contribute to a favourable tension on the front segment as the boom load is transferred thereto, and to the torsional rigidity of the structure of the base, support, and frontal component.

It is noted that the frontal component and the support components may be provided with additional bulkheads, i.e. with bulkheads in addition to the bulkheads that in the frontal component extend in the radial direction and that in the support components extend parallel to the boom pivot axis. Also in an embodiment, not all the bulkheads in the frontal component and/or in the support components are in register with bulkheads provided in the annular base component.

In an embodiment, the outer wall of each support component comprises a front wall and a side wall, wherein the front wall extends in a vertical plane parallel to the pivot axis, and the side wall extends in a vertical plane perpendicular to the pivot axis. By this arrangement, when seen in a top view, the support component essentially forms a right triangle with the base of the triangle extending along the annular base component and the top of the triangle forming the point that lies most outward from the annular component. As a result, the support components constitute an outer widening of the base component at the front segment thereof. The side wall extending longitudinally and vertically, makes that it extends in the longitudinal direction of the boom, providing torsional rigidity in the direction of the load. The outer widening, and the torsional rigidity are both to the benefit of a stable support of the boom.

In an embodiment, at least a part of the front wall of the frontal component, e.g. the entire front wall, extends forward from the two support components. For example at least a part of the outer circumferential wall of the base component extends forward from the two support components. For example, a part of the inner circumferential wall of the base component extends forward from the two support components as well, so that at least a part of the front segment extends forward from the two support components. In an embodiment each support component and the respective boom support, is provided at an angular position with respect to the slew axis of between 30-60°, for example between 35-55°, for example between 40-50°, for example around 45°, from a longitudinal center line of the crane housing through the slew axis. In an embodiment, the boom supports each have a lateral distance from the longitudinal center axis of the crane housing through the slew axis that is substantially equal to or larger than the radius of the annular base component with respect to the slew axis. In an embodiment the boom supports each have a longitudinal distance from a lateral center axis of the crane housing through the slew axis that is substantially equal to or larger than the radius of the annular base component with respect to the slew axis. These embodiments provide advantages in terms of stable boom support, mechanical stiffness and load distribution.

In an embodiment of a crane housing according to the invention, the top wall of the two support components is integral with the top wall of the frontal component, and the top walls thus form an integral top wall, and wherein the bulkheads of the two support components and the frontal component are connected to the so formed integral top wall.

In a further embodiment, the bottom wall of the two support components is integral with the bottom wall of the frontal component, and the bottom walls thus form an integral bottom wall, and wherein the bulkheads of the two support components and the frontal component are connected to the so formed integral bottom wall.

In an embodiment, the top wall of the annular base component is integral with the top wall of the two support components and the top wall of the frontal component, and the bulkheads of the annular base component, the two support components and the frontal component are connected to the so formed integral top wall. In such an embodiment, the top wall of the torsion box is in register with the top wall of the annular base component, which allows for an optimal load transfer from the torsion box to the annular base component, and thus provides advantages in terms of robustness and mechanical stiffness.

In a further embodiment, the bottom wall of the annular base component is integral with the bottom wall of the two support components and the bottom wall of the frontal component, and wherein the bulkheads of the annular base component, the two support components and the frontal component are connected to the so formed integral bottom wall. This embodiments provide advantages in terms of robustness and mechanical stiffness—resulting e.g. from less interconnections, less parts, and less physical interruptions of the walls, and may facilitate the fabrication of the crane housing.

In an embodiment, the top walls and the bottom walls of the frontal component and the two support components, e.g. formed as one integral top wall and one integral bottom wall respectively, define a substantially constant height there between over a surface area of the top and bottom walls. As a result the outer walls and the bulkheads of these components have a constant height, and the top and bottom walls may be flat. The interconnection of the torsion box to the generally flat top of the annular base component may be facilitated.

In an embodiment the crane housing is to be mounted on the slew bearing at the bottom wall of the annular base component. In such an embodiment, the bottom wall of the annular base component forms an interface between the slew bearing and the crane housing.

In an embodiment, the torsion box, formed by the two support components and the frontal component, is connected to a top section of the annular base component. In such an embodiment, the annular base component comprises a top section, having a height similar to the height of the torsion box, and a bottom section, extending below the torsion box. Thus, the bottom wall of the torsion box, formed by the bottom walls of the front component and the support components, e.g. an integral bottom wall, is spaced from the bottom wall of the annular base component, and is connected to the outer wall of the annular base component.

In an embodiment, the height of the bottom section of the annular base component is at least one third of the height of the top section of the annular base component, for example is half the height of the top section of the base component. In a preferred embodiment, the top section of the of the annular base component has a height similar to the height of the bottom section of the base component.

In a preferred embodiment, the bottom wall(s) of the front component and the support components are level, and thus provide the torsion box with an integral bottom wall, which integral bottom wall is spaced from the bottom wall of the annular base component.

Furthermore, preferably, the annular base component is provided with an intermediate wall, parallel to the bottom wall and the top wall of the annular base component, which intermediate wall is level with the bottom wall(s), e.g. integral bottom wall, of the torsion box, at least with an inner end of these bottom wall(s), of the torsion box. This allows for an optimal connection between the torsion box, at a bottom end thereof, and the annular base component, and thus in use benefits the transfer of the load of the boom as a torsion onto the annular base component by means of the torsion box supporting the boom.

In such an embodiment, the bulkheads are provided both in the top section of the annular base component and in the bottom section of the annular base component. Therein the bulkheads preferably extend radially with respect to the slew axis, with angular spacing there between, for example divided evenly over the top section and the bottom section of the annular component in an angular direction, for example vertically in register with one another.

In an embodiment wherein the torsion box is connected to an upper section of the annular base component, bulkheads of the annular base component that are in register with bulkheads in the frontal component and/or with bulkheads in the support components, are located in the top section of the annular base component, and preferably extend between the top wall of the annular base component and the intermediate wall of the base component. Furthermore, these bulkheads provided in the top section of the base component are preferably in register, i.e. vertically aligned, with bulkheads in the bottom section of the annular base component, e.g. with bulkheads on an opposite vertical side of the intermediate wall of the annular base component.

In a further preferred embodiment, the inner circumferential wall of the annular base component is vertical, i.e. parallel to the slew axis, along both the upper section and the lower section of the annular base component. And in yet a further preferred embodiment, the outer circumferential wall of the annular base component, is vertical, i.e. parallel to the slew axis, along the upper section of the annular base component, and is inclined along the bottom section of the annular base components, such that the annular base component tapers in a downward direction. Such an embodiment allows for a upper section of the annular base component to be wider than the top surface of the slew bearing, and thus allows for improved structural rigidity of the annular base component. Furthermore, the load transferred onto the annular base component by the torsion box, is transferred via the tapered bottom section of the annular base component to the slew bearing, which further improves the load distribution over the crane housing and over slew bearing as transferred thereto from the crane housing.

Preferably, the bottom section of the annular base component comprises bulkheads between the inner circumferential wall thereof and an outer circumferential wall, for structural stiffness thereof.

In general, the bottom section of the annular base component advantageously provides a vertically intermediate structure between the top section of the annular base component and the slew bearing, via which the tensioning of the annular base component is transferred to the slew bearing. This may further distribute the material stresses over the crane housing, and lead to a more favorable mechanical load profile of the crane housing and the slew bearing.

The bottom wall of the annular base component may have connection elements at its bottom surface, for example integral therewith, for example apertures, for connection, e.g. by bolting, of the crane housing to the slew bearing.

It is submitted that leg encircling cranes typically are provided with a crane gantry for supporting the boom. Such a crane gantry in general comprises a crane gantry compression member and a crane gantry tension member, wherein the compression member and the tension member are frames, each comprising two legs that are supported at their base by the crane housing. The compression member is supported at a front segment of the crane housing and the tension member is supported at a rear segment of the crane housing. The frames are connected at a top end thereof to form a truss for supporting the luffing wires for holding the boom.

In an embodiment, the crane housing is configured to support a crane gantry, the crane gantry comprising a crane gantry compression member and a crane gantry tension member, and is provided with two crane gantry compression member supports, each provided on one of the respective support components at one of the two boom supports, and is provided with two crane gantry tension member supports, each provided on a rear segment of the annular base component, and each at a lateral distance from a longitudinal center axis of the crane housing through the slew axis that is smaller than the radius of the annular base component with respect to the slew axis.

In such an embodiment, the crane housing is configured for use with a crane having a crane gantry that comprises a crane gantry compression member and a crane gantry tension member, wherein the crane gantry compression member has a width, at least at a base of the crane gantry compression member, that is larger than the width of the crane gantry tension member, at least at the base thereof.

In an embodiment of a crane housing according to the invention, the annular base component has a substantially constant cross section, i.e. the inner circumferential wall and the outer circumferential wall of the annular base component are circular and concentric, and the top wall and the bottom wall of the annular base component are horizontal. Thus, the annular base component forms a circular ring shaped component, which at a front section thereof is provided with the torsion box, and preferably has a top wall that is integral with the top wall of the torsion box, i.e. that is integral with the top wall of the two support components and the frontal component.

In an embodiment, the two crane gantry tension member supports are located vertically above the rear segment of the annular base component, such that, when seen in a top view, the two crane gantry tension member supports substantially overlap with the annular base component.

In an embodiment, the two crane gantry tension member supports are each connected to the annular base component via an A-shaped support frame, the support frames each comprising two support arms that diverge in a direction towards the annular base component, and which support arms are, at a lower end, mounted to the annular base component. Thus, the support frames are an integral component of the crane housing.

Thus, by providing the crane gantry tension member supports with an A-shaped support frame, which support frame is provided between the crane gantry tension member supports and the annular base component, the crane gantry tension support members are located vertically above the annular base component and are vertically spaced from the annular base component.

When the crane is in use, the tensional load on the crane gantry tension members is transferred via the crane gantry tension member supports and the support frame to the annular base component. Because the support frames are A-shaped for each crane gantry tension member support, the tensional load is transferred through the support frames of the support frame to the annular base component at two isolated, mutually spaced, locations.

In prior art the crane gantry tension member supports are typically provided directly on the crane housing, and the tensional load is not guided to the crane housing at two isolated, mutually spaced, locations.

Preferably, the A-shaped support frames are each substantially symmetrical relative to a vertical center plane, such that, when seen in top view, the crane gantry tension member supports are centered relative to the locations at which the respective support frame, more in particular the support arms of the respective support frame, are mounted to, preferably the top wall of, the annular base component.

The invention furthermore relates to a crane housing for a leg encircling crane, for use on a jack-up vessel comprising horizontally spaced apart jack-up legs, wherein the crane housing is configured to be mounted onto a slew bearing having a slew axis, and extending about one of the jack-up legs of the jack up vessel, for allowing slew motion of the crane housing of the crane around a vertical slew axis, to pivotally support a crane boom at a front of the crane housing so that the boom is pivotal about a substantially horizontal pivot axis, and to support a crane superstructure, e.g. a crane gantry tension member, at a back of the crane housing, wherein the crane housing is a box-type construction, the crane housing comprising an annular base component, configured to extend about a jack-up leg of the jack-up vessel, the annular base component having a substantially constant cross section, having an inner circumferential wall and the outer circumferential wall that are circular and concentric, and a top wall and the bottom wall extending between the inner circumferential wall and the outer circumferential wall, furthermore, the annular base component comprises bulkheads that extend between the inner circumferential wall and the outer circumferential wall, the top wall and preferably the bottom wall;

wherein the crane housing is provided with two boom supports, for pivotally supporting two inner ends of the boom, e.g. an A-frame boom, of the crane so that said boom is pivotal about a horizontal pivot axis through the two boom supports, and wherein the crane housing preferably is provided with a torsion box, and each boom support is mounted on a support component that is part of the torsion box, wherein the crane housing is configured to support a crane gantry, the crane gantry comprising a crane gantry compression member and a crane gantry tension member, and is provided with two crane gantry compression member supports, each provided at one of the two boom supports, and is provided with two crane gantry tension member supports, each located on a rear segment of the annular base component, and preferably each at a lateral distance from a longitudinal center axis of the crane housing through the slew axis that is smaller than a radius of the annular base component with respect to the slew axis.

In a further embodiment, the two crane gantry tension member supports are each connected to the annular base component via an A-shaped support frame, the support frames each comprising two support arms that diverge in a direction towards the annular base component, and which support arms are, at a lower end, mounted to the annular base component. Preferably, the support frames are an integral component of the crane housing.

Thus, in such an embodiment, the two crane gantry tension member supports are located vertically above the rear segment of the annular base component, preferably such that, when seen in a top view, the two crane gantry tension member supports substantially overlap with the annular base component.

In a further embodiment, the support arms of the A-shaped support frames, are box type elements, the support arms comprising a front wall, a rear wall, an inside wall and an outside wall.

For each of the support arms, for each of the support frames, the front wall has an outside surface that faces towards, and is parallel to, a lateral center axis of the crane housing through the slew axis, and the rear wall has an outside surface that faces away, and is parallel to, the lateral center axis of the crane housing through the slew axis. It is noted that the lateral center axis is parallel to the boom pivot axis.

For each of the support arms, for each of the support frames, the inside wall has an outside surface that faces towards, and is parallel to, a longitudinal center axis of the crane housing through the slew axis, and the outside wall has an outside surface that faces away, and is parallel to, the longitudinal center axis of the crane housing through the slew axis. It is noted that the longitudinal center axis is perpendicular to the boom pivot axis.

In a further preferred embodiment, the annular base component comprises at least four bulkheads, each associated with a respective one of the support arms, so that each of the support arms has at least one bulk head associated therewith, and provided in the annular base component at the lower ends of the support arms, which bulkheads each are with a top end are in register with one of the inside walls or outside walls of the support arms, and which at least four bulkheads are perpendicular to the boom pivot axis.

The at least four bulkheads associated with the support arms, extend between the inner circumferential wall and the outer circumferential wall of the annular base component, and are each with a top end in register with the associated walls of the support arms. Thus, a top end of one of the four bulkheads and a bottom end of one of the walls of the support arms are located adjacent to, and on opposite sides of, the top wall of the annular base component. Furthermore the top end of the bulkhead is therefore aligned with, and runs parallel to, the bottom end of the associated wall of the support frame. Thus, when during use the A-shaped support frames are loaded by the tension member of the crane gantry, the four bulkheads function as a continuation of the associated inside wall or outside wall of the respective support arm.

It is noted that the bulkheads, and thus the inside walls and outside walls of the support arms, do not extend in a radial direction relative to the slew axis of the slew bearing that is to support the crane housing. Instead the bulkheads are perpendicular to the boom pivot axis. This configuration of the support arms and the associated bulkheads provides during use an optimal transfer of tensional load from the tension member of a crane gantry supported by the crane housing, to the slew bearing onto which the crane housing is mounted.

The invention furthermore relates to a crane housing for a leg encircling crane, for use on a jack-up vessel comprising horizontally spaced apart jack-up legs, wherein the crane housing is configured to be mounted onto a slew bearing having a slew axis, and extending about one of the jack-up legs of the jack up vessel, for allowing slew motion of the crane housing of the crane around a vertical slew axis, to pivotally support a crane boom at a front of the crane housing so that the boom is pivotal about a substantially horizontal pivot axis, and to support a crane superstructure, e.g. a crane gantry tension member, at a back of the crane housing, wherein the crane housing is a box-type construction, and the crane housing comprises an annular base component, configured to extend about a jack-up leg of the jack-up vessel, the annular base component having a substantially constant cross section, having an inner circumferential wall and the outer circumferential wall that are circular and concentric, and a top wall and the bottom wall extending between the inner circumferential wall and the outer circumferential wall, furthermore, the annular base component comprises bulkheads that extend between the inner circumferential wall and the outer circumferential wall, the top wall and the bottom wall;

wherein the crane housing is provided with two boom supports, for pivotally supporting two inner ends of the boom, e.g. an A-frame boom, of the crane so that said boom is pivotal about a horizontal pivot axis through the two boom supports, and wherein the crane housing preferably is provided with a torsion box, and each boom support is mounted on a support component that is part of the torsion box, wherein the crane housing is configured to support a crane gantry, the crane gantry comprising a crane gantry compression member and a crane gantry tension member, and is provided with two crane gantry compression member supports, each provided at one of the two boom supports, and is provided with two crane gantry tension member supports, each located on a rear segment of the annular base component, wherein the two crane gantry tension member supports are each connected to the annular base component via an A-shaped support frame, the support frames each comprising two support arms that diverge in a direction towards the annular base component, and which support arms are, at a lower end, mounted to the annular base component, wherein the support arms of the A-shaped support frames, are box type elements, the support arms comprising a front wall, a rear wall, an inside wall and an outside wall, wherein, for each of the support arms, for each of the support frames, the front wall has an outside surface that faces towards, and preferably is parallel to, a lateral center axis of the crane housing through the slew axis, and the rear wall has an outside surface that faces away, and is preferably parallel to, the lateral center axis of the crane housing through the slew axis.

wherein, for each of the support arms, for each of the support frames, the inside wall has an outside surface that faces towards, and is parallel to, a longitudinal center axis of the crane housing through the slew axis, and the outside wall has an outside surface that faces away, and is parallel to, the longitudinal center axis of the crane housing through the slew axis, and wherein, the annular base component comprises at least four, e.g. eight, bulkheads each associated with a respective one of the support arms, so that each of the support arms has at least one bulk head associated therewith, and provided in the annular base component at the lower ends of the support arms, which bulkheads each with a top end are in register with one of the inside walls or outside walls of the support arms, and which at least four bulkheads are perpendicular to the boom pivot axis.

Thus, in such an embodiment, the two crane gantry tension member supports are located vertically above the rear segment of the annular base component, preferably such that, when seen in a top view, the two crane gantry tension member supports substantially overlap with the annular base component.

It is furthermore noted that the lateral center axis is parallel to the boom pivot axis, and that the longitudinal center axis is perpendicular to the boom pivot axis.

The at least four bulkheads associated with the support arms, extend between the inner circumferential wall and the outer circumferential wall of the annular base component, and are in register with the associated walls of the support arms. Thus, a top end of one of the four bulkheads and a bottom end of one of the walls of the support arms are located adjacent to, and on opposite sides of, the top wall of the annular base component. Furthermore the top end of the bulkhead is therefore aligned with, and runs parallel to, the bottom end of the associated wall of the support frame. Thus, when during use the A-shaped support frames are loaded by the tension member of the crane gantry, the at least four bulkheads function as a continuation of the associated inside wall or outside wall of the respective support arm.

It is noted that the bulkheads, and thus the inside walls and outside walls of the support arms, do not extend in a radial direction relative to the slew axis of the slew bearing that is to support the crane housing. Instead the bulkheads are perpendicular to the boom pivot axis. This configuration of the support arms and the associated bulkheads provides during use an optimal transfer of tensional load from the tension member of a crane gantry supported by the crane housing, to the slew bearing onto which the crane housing is mounted.

It is noted that the crane housing described herein comprises a central opening, defined by the inner circumferential wall of the annular base component. The central opening of the crane housing has a center axis, which center axis coincides with the slew axis of the bearing onto which the crane housing is to be mounted. Thus, when the crane housing is mounted on the slew bearing, the center axis of the central opening of the crane housing corresponds to the slew axis of the slew bearing.

The invention furthermore relates to a leg encircling crane comprising the crane housing as described herein. The leg encircling crane comprises the slew bearing extending about one of the jack-up legs of a jack up vessel, for allowing slew motion of the crane housing of the crane around the vertical slew axis, the crane boom supported at a front of the crane housing, and the crane superstructure, e.g. a crane gantry, supported at a back of the crane housing.

The invention furthermore relates to a jack-up vessel comprising jack-up legs, a hull, and the leg encircling crane as described.

The invention furthermore relates to a method for handling an object, e.g. hoisting the object, wherein use is made of the leg encircling crane as described. In particular, the inner ends of the boom of the crane are therein advantageously both supported on the crane housing of the crane outwardly from the annular base component, and the load of the boom, as applied on the boom support, subjects the base component via the torsion box to a torsion that is distributed over the front segment of the base component.

The invention furthermore relates to a torsion box as described herein, comprising the support components and the frontal component, for use in a crane housing, and configured to be mounted to an annular component of the crane housing at the front of the crane housing.

BRIEF DESCRIPTION OF THE DRAWINGS

The invention will now be described with reference to the embodiment shown in the appended figures. Of the figures.

DETAILED DESCRIPTION OF EMBODIMENTS

Figure 1:
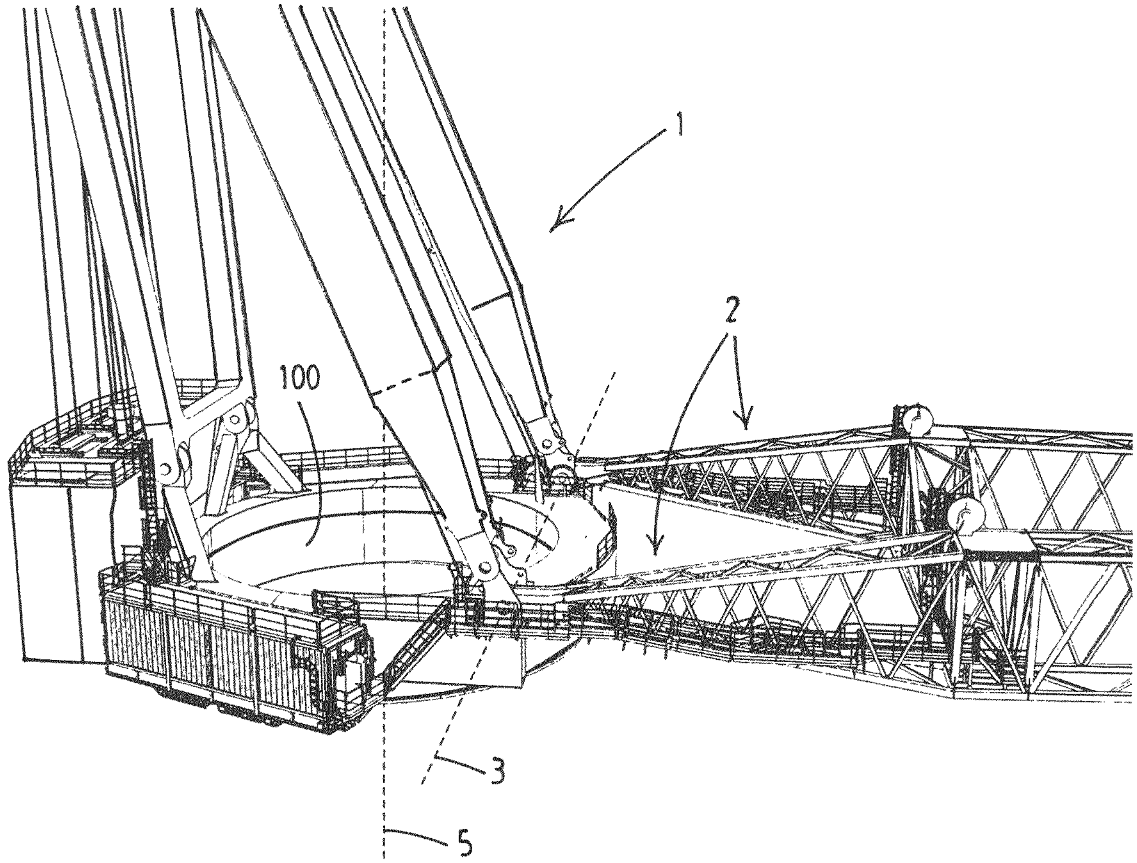
FIG. 1 illustrates in a top-side-frontal perspective view a crane housing according to the invention in a leg encircling crane.

The figures illustrate a possible embodiment of the crane housing 100 according to the invention. In FIG. 1, the crane housing 100 is shown in leg encircling crane 1. The crane housing 100 is configured to be mounted onto a slew bearing (not shown), extending about one of the jack-up legs of the jack up vessel, for allowing slew motion of the crane housing 100 of the crane around vertical slew axis 5.

The crane housing 100 is furthermore configured to support a crane boom at a front of the crane housing. Thereto the crane housing 100 is provided with two boom supports 102, for pivotally supporting two inner ends 2 of the boom, here an A-frame boom, of the crane 1 so that said boom is pivotal about a horizontal pivot axis 3 through the two boom supports 102.

The crane housing 100 is furthermore configured and to support a crane crane gantry, not shown here, at a back of the crane housing 100. Thereto the crane housing 100 is provided with two crane gantry supports, in the embodiment shown two crane gantry compression member supports 404, of the crane 1.

The crane housing 100 is a box-type construction.

Figure 2:
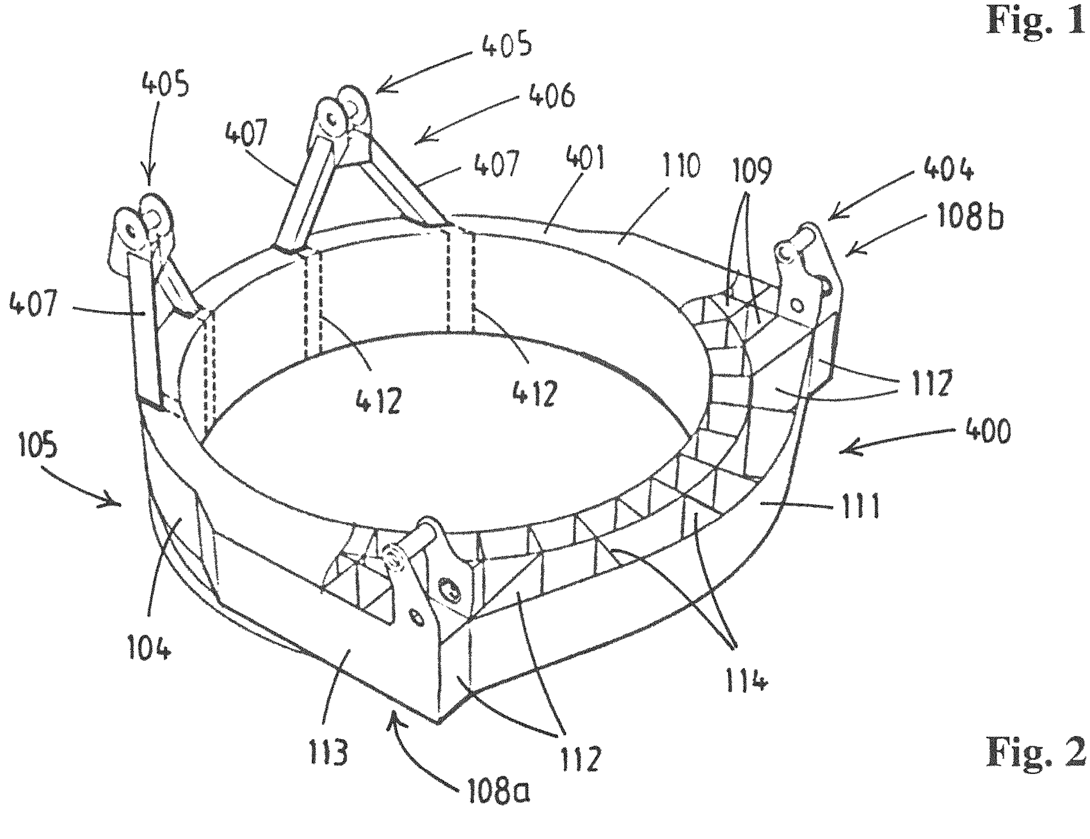
FIG. 2 illustrates in the same view the same crane housing isolated from the leg encircling crane.

FIG. 2 illustrates the crane housing 100 with a part of the integral top wall 110 thereof being removed at a front part of the crane housing 100, so that the internal structure is visible.

Figure 3:
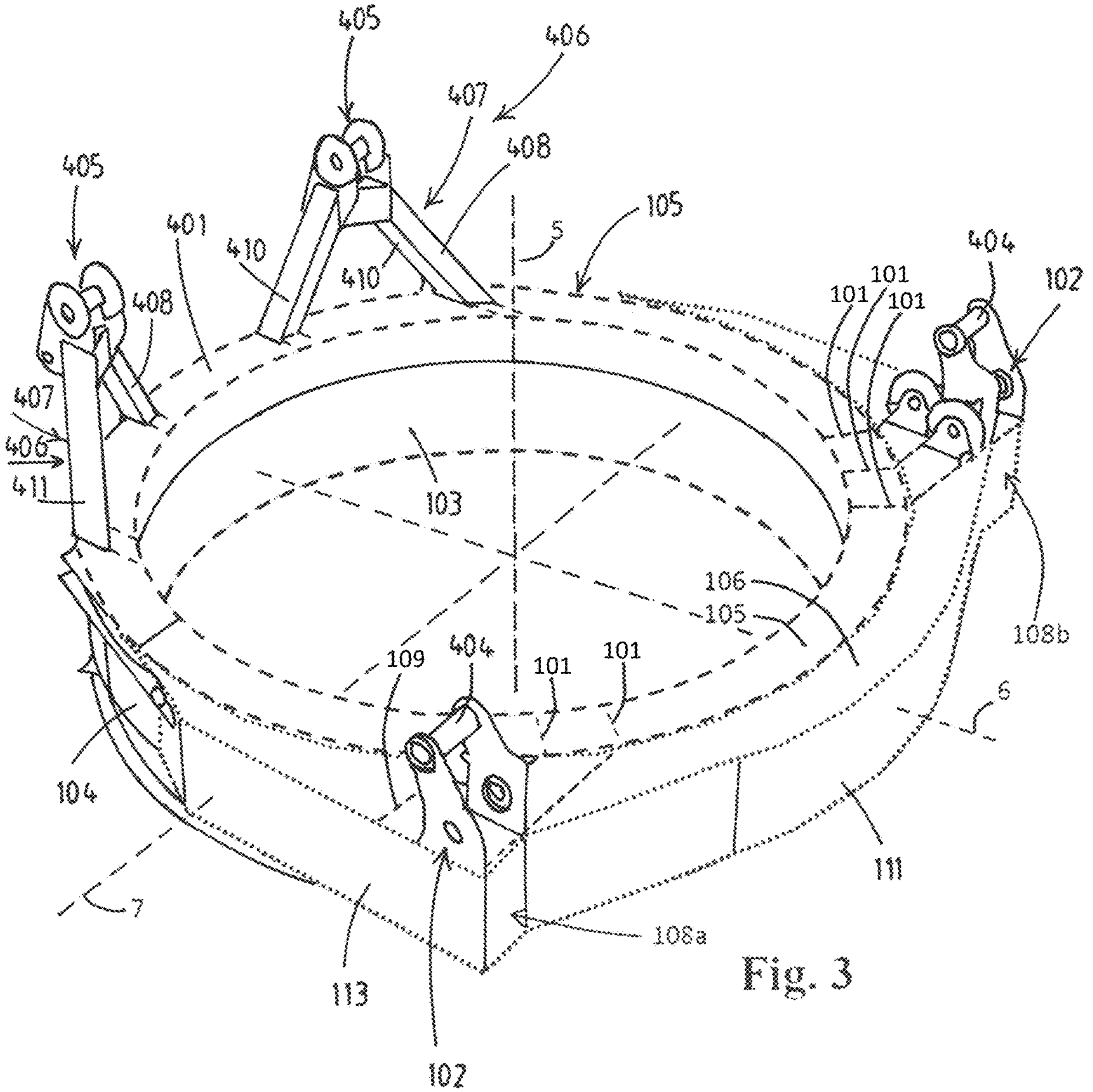
FIG. 3 illustrates in the same view the same crane housing isolated from the leg encircling crane, FIG. 4 schematically illustrates different components of the same crane housing in a top view thereof.
Figure 4:
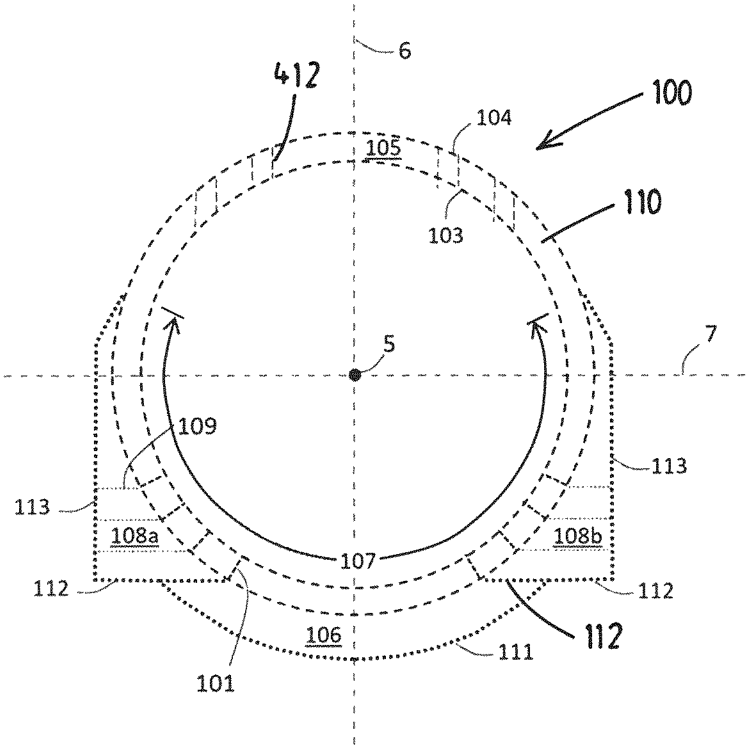

FIG. 3 shows the crane housing 100 again, but now without removal of a part of the top wall 110, and with an indication of a few parts thereof by dashed and dotted lines. In FIG. 4, a schematic top view is shown in which the arrangement of these same parts is visible.

As can be verified from the combination of these figures, the crane housing comprises an annular base component 105, a left support component 108*a*, a right support component 108*b*, and a frontal component 106.

The annular base component 105 is configured to extend about a jack-up leg of the jack-up vessel. It has an inner circumferential wall 103, an outer circumferential wall 104, and bulkheads 101 extending between the inner circumferential wall and the outer circumferential wall. The bulkheads 101 of the annular base component 105 extend radially with respect to the slew axis 5 at least in front segment 107 of the annular base component.

The two support components 108*a*, 108*b* are each connected to the annular base component 105 on a respective lateral side of a front segment 107 of the annular base component 105.

The support components 108*a*, 108*b* each have an outer wall 112, 113, that is at two ends attached to the outer wall 104 of the annular base component 105. The outer wall 112, 113 of each support component 108*a*, 108*b* comprises a front wall 112 and a side wall 113. The front wall 112 extends in a vertical plane parallel to the pivot axis 3 and the side wall 113 extends in a vertical plane perpendicular to the pivot axis 3—thus when seen in top view, parallel to the longitudinal axis 6, see FIG. 4.

The support components 108*a*, 108*b* each have bulkheads 109 extending between the outer wall 112, 113 of the support component 108*a*, 108*b* and the outer circumferential wall 104 of the annular base component 105. In FIG. 2 it is visible that these bulkheads extend in vertical planes. The bulkheads extend, seen in a top view of the crane housing, parallel to the pivot axis 3 of the boom. Each of the bulkheads 109 of the support components 108*a*, 108*b* extends outwardly from an outer end of a respective one of the bulkheads 101 of the annular base component 105 in the front segment 107 thereof.

The frontal component 106 is connected to the front segment 107 of the base component 105 in front thereof, and between the two support components 108*a*, 108*b*. It connects the left support component 108*a* to the right support component 108*b*. The frontal component 106 has a front wall 111 that is at its left end attached to the front wall 112 of a the left support component 108*a* and at its right end to the front wall 112 of the right support component 108*b*.

The frontal component has bulkheads 114 extending between the front wall 111 of the frontal component 106 and the outer circumferential wall 104 of the annular base component 105. Each of the bulkheads 114 of the frontal component 106 extends outwardly, in particular radially, from an outer end of a respective one of the bulkheads 101 of the annular base component 105 in the front segment 107 thereof.

The two support components 108*a*, 108*b* and the frontal component 106 together form a front torsion box 400 which provides torsional rigidity. The load of the boom, as applied on the boom supports 102, subjects the base component 105 via the torsion box 400 to a torsion that is distributed over the front segment 107 of the base component 105.

The top wall 401 of the annular base component 105 is integral with the top wall of the two support components 108*a*, 108*b* and the top wall of the frontal component 106. The bulkheads 101, 109, 114 of the annular base component 105, the two support components 108*a*, 108*b* and the frontal component 106 are connected to the so formed integral top wall 110.

Figure 5:
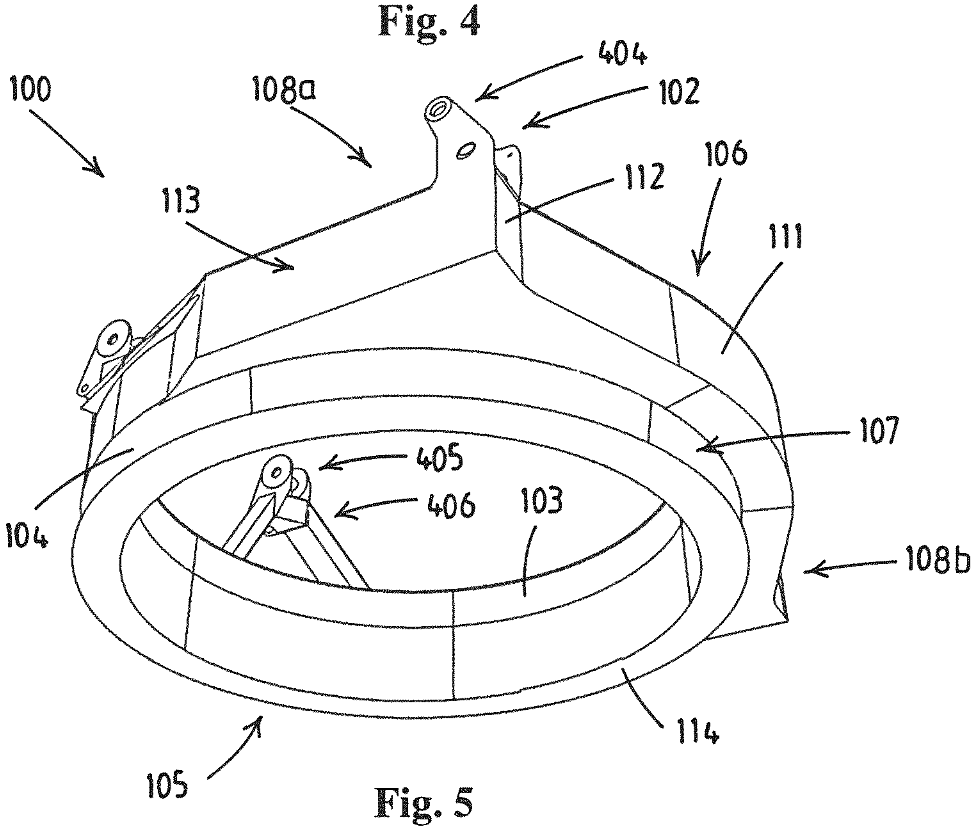
FIG. 5 illustrates in a bottom-side-frontal perspective view the same crane housing.

As is partly visible in FIG. 5, the bottom wall of the annular base component 105 is integral with the bottom wall of the two support components 108*a*, 108*b* and the bottom wall of the frontal component 106. The bulkheads 101, 109, 114 of the annular base component 105, the two support components 108*a*, 108*b* and the frontal component 106 are connected to the so formed integral bottom wall.

As best shown in FIG. 4, the entire the front wall 111 of the frontal component 106 extends forward from the two support components 108*a*, 108*b*. A part of the outer circumferential wall 104 of the base component 105, in the front segment, extends forward from the two support components 108*a*, 108*b* as well.

Referring again to FIG. 4, the left support component 108*a*, and the respective boom support 102 on top of it, is provided at an angular position with respect to the slew axis of around 40-50° from the longitudinal center line 6 of the crane housing 100 through the slew axis 5, so in a clockwise direction from the longitudinal center line 6. The right support component 108*b* and the respective boom support 102 on top of it is provided at the same angle from the longitudinal center line 6 in the counterclockwise angular direction. The boom supports 102 each have a lateral distance from the longitudinal center axis 6 of the crane housing 100 through the slew axis 5 that is substantially equal to the radius of the annular base component 105 with respect to the slew axis 5. The boom supports 102 each have a longitudinal distance from a lateral center axis 7 of the crane housing 100 through the slew axis 5 that is substantially equal to or larger than the radius of the annular base component with respect to the slew axis 5.

As visible from FIGS. 1-3 and 5, the integral top wall 110 and the integral bottom wall define a substantially constant height there between over the entire surface area of the top and bottom walls.

In the embodiment shown in the figures, the crane housing 100 is configured to support a crane gantry comprising a crane gantry compression member and a crane gantry tension member. The crane housing 100 is therefore provided with two crane gantry compression member supports 404, each provided on one of the respective support components 108*a*, 108*b* at one of the two boom supports 102. The crane housing is furthermore provided with two crane gantry tension member supports 405, each located on a rear segment of the annular base component 105. The two crane gantry tension member supports are each located at a lateral distance from the longitudinal center axis 6 of the crane housing 100 through the slew axis 5, which lateral distance is smaller than the radius of the annular base component with respect to the slew axis. Furthermore, the two crane gantry tension member supports 405 are located vertically above the rear segment of the annular base component 105, such that, when seen in a top view, the two crane gantry tension member supports 405 substantially overlap with the annular base component 105.

Thus, the crane housing 100 is configured for use with a crane having a crane gantry that comprises a crane gantry compression member and a crane gantry tension member, wherein the crane gantry compression member has a width, at least at a base of the crane gantry compression member, that is larger than the width of the crane gantry tension member, at least at the base thereof.

Furthermore, in the exemplary embodiment shown, the annular base component 105 of the crane housing 100 has a substantially constant cross section, see for example FIG. 4. The inner circumferential wall 103 and the outer circumferential wall 104 of the annular base component 105 are circular and concentric, and the top wall 401 and the bottom wall 402 of the annular base component 105 are horizontal. Thus, the annular base component 105 forms a circular ring shaped component, which, at a front section thereof is provided with the torsion box 400, and in the exemplary embodiment shown, has a top wall 110 that is integral with the top wall of the torsion box 400, i.e. that is integral with the top wall of the two support components 108*a*, 108*b* and the top wall the frontal component 106.

Furthermore, in the exemplary embodiment shown, the two crane gantry tension member supports 405 are each connected to the annular base component 105 via an A-shaped support frame 406. The support frames 406 each comprise two support arms 407 that diverge in a direction towards the annular base component 105. Furthermore, the support arms 407 are, at a lower end, mounted to the annular base component 105. Thus, the support frames 406 are an integral component of the crane housing.

By providing the crane gantry tension member supports 405 each with an A-shaped support frame 406, which support frame is provided between the crane gantry tension member supports and the annular base component, the crane gantry tension support members are located vertically above the annular base component and are vertically spaced from the annular base component, see for example FIG. 3 and FIG. 5

When the crane is in use, the tensional load on the crane gantry tension members is transferred via the crane gantry tension member supports 405 and the support frames 406 to the annular base component 105. Because the support frames 406 are A-shaped for each crane gantry tension member support, the tensional load is transferred through the individual support arms 407 of the support frame 406 to the annular base component 105 at two isolated, mutually spaced, locations.

Preferably, the A-shaped support frames 406 are each substantially symmetrical relative to a vertical center plane, see for example FIG. 3, such that, when seen in top view, the crane gantry tension member supports 405 are centered relative to the locations at which the respective support frame, more in particular the support arms 407 of the respective support frame, are mounted to, preferably the top wall 401 of, the annular base component 105.

In the exemplary embodiment shown in the figures, the support arms 407 of the A-shaped support frames 406, are box type elements. The support arms comprising a front wall 408, a rear wall 409, an inside wall 410 and an outside wall 411.

For each of the support arms 407, for each of the support frames 406, the front wall 408 has an outside surface that faces towards, and is parallel to, the lateral center axis 7 of the crane housing 100 through the slew axis 5, and the rear wall 409 has an outside surface that faces away, and is parallel to, the lateral center axis 7 of the crane housing 100 through the slew axis. It is noted that the lateral center axis 7 is parallel to the boom pivot axis 3.

For each of the support arms 407, for each of the support frames 406, the inside wall 410 has an outside surface that faces towards, and is parallel to, the longitudinal center axis 6 of the crane housing 100 through the slew axis 5, and the outside wall 411 has an outside surface that faces away, and is parallel to, the longitudinal center axis 6 of the crane housing 100 through the slew axis 5. It is noted that the longitudinal center axis 6 is perpendicular to the boom pivot axis 3.

Furthermore, in the exemplary embodiment shown, the annular base component 100 comprises eight bulkheads associated with the support arms 406, and provided in the annular base component 100 at the lower ends of the support arms 406, which bulkheads each with a top end are in register with one of the inside walls 410 or outside walls 411 of the support arms 406, and which eight bulkheads are perpendicular to the boom pivot axis 3. The bulkheads 412 are indicated in FIG. 2 with dotted lines.

The eight bulkheads associated with the support arms 406, extend between the inner circumferential wall 103 and the outer circumferential wall 104 of the annular base component 100, and are in register with the associated walls of the support arms 406. Thus, a top end of one of the eight bulkheads and a bottom end of one of the walls 408, 409, 410, 411 of the support arms 406 are located adjacent to, and on opposite sides of, the top wall 401 of the annular base component 100. Furthermore the top end of the bulkhead is therefore aligned with, and runs parallel to, the bottom end of the associated wall of the support frame 406.

Thus, when during use the A-shaped support frames 406 are loaded by the tension member of the crane gantry, the eight bulkheads function as a continuation of the associated inside wall 410 or outside wall 411 of the respective support arm 406.

It is noted that the bulkheads, and thus the inside walls and outside walls of the support arms, do not extend in a radial direction relative to the slew axis of the slew bearing that is to support the crane housing. Instead the bulkheads are perpendicular to the boom pivot axis. This configuration of the support arms and the associated bulkheads provides during use an optimal transfer of tensional load from the tension member of a crane gantry supported by the crane housing, to the slew bearing onto which the crane housing is mounted.

In FIG. 5 it is shown that the torsion box 400, formed by the two support components 108*a*, 108*b* and the frontal component 106, is connected to a top section of the annular base component 105. The bottom walls of the front component and the support components are integral with one another to form an integral bottom wall of the torsion box 400. This integral bottom wall is connected to the outer wall 104 of the annular base component 105, and is vertically spaced from the bottom wall of the annular base component 105.

In FIG. 5, it is best visible that the annular base component comprises a bottom section 114, which is attached to a top section of the annular base component 105 of the crane housing 100. Via this bottom section 114 the crane housing 100 is mountable onto the slew bearing.

The bottom section 114 comprises bulkheads (not shown) between the inner circumferential wall 103 and the outer circumferential wall 104.

The invention claimed is:

1. A crane housing for a leg encircling crane, for use on a jack-up vessel comprising horizontally spaced apart jack-up legs, wherein the crane housing is configured to be mounted onto a slew bearing extending about one of the jack-up legs of the jack up vessel, for allowing slew motion of the crane housing of the crane around a vertical slew axis, to support a crane boom at a front of the crane housing, and to support a crane superstructure, wherein the crane housing is a box-type construction, the crane housing comprising:

an annular base component, configured to extend about a jack-up leg of the jack-up vessel, having an inner circumferential wall, an outer circumferential wall, bulkheads extending between the inner circumferential wall and the outer circumferential wall, and a top wall;

two support components, each connected to the annular base component on a respective lateral side of a front segment of the annular base component, the support components each having an outer wall, that is at two ends attached to the outer wall of the base component, bulkheads extending between the outer wall of the support component and the outer circumferential wall of the annular base component, a top wall and a bottom wall; and a frontal component, connected to the front segment of the base component in front thereof, and between the two support components such as to interconnect the support components, the frontal component having a front wall that is at each of two ends thereof attached to the outer wall of a respective one of the support components, bulkheads extending between the front wall of the frontal component and the outer circumferential wall of the annular base component, a top wall and a bottom wall, wherein the crane housing is provided with two boom supports, each mounted on a respective support component, for pivotally supporting two inner ends of the boom of the crane so that said boom is pivotal about a horizontal pivot axis through the two boom supports, and wherein the two support components and the frontal component together form a torsion box that provides torsional rigidity, such that the load of the boom, as applied on the boom supports, subjects the base component via the torsion box to a torsion that is distributed over the front segment of the base component.

2. The crane housing according to claim 1, wherein of the bulkheads of the support components extends outwardly from an outer end of a respective one of the bulkheads of the annular base component in the front segment thereof.

3. The crane housing according to claim 1, wherein the bulkheads of the support components extend, seen in a top view of the crane housing, parallel to the pivot axis of the boom.

4. The crane housing according to claim 1, wherein each of the bulkheads of the frontal component extends outwardly.

5. The crane housing according to claim 1, wherein the outer wall of each support component comprises a front wall and a side wall, wherein the front wall extends in a vertical plane parallel to the pivot axis.

6. The crane housing according to claim 1, wherein at least a part of the front wall of the frontal component extends forward from the two support components.

7. The crane housing according to claim 1, wherein the boom supports each have a lateral distance from a longitudinal center axis of the crane housing through the slew axis that is substantially equal to or larger than the radius of the annular base component with respect to the slew axis.

8. The crane housing according to claim 1, wherein the boom supports each have a longitudinal distance from a lateral center axis of the crane housing through the slew axis that is substantially equal to or larger than the radius of the annular base component with respect to the slew axis.

9. The crane housing according to claim 1, wherein the top wall of the annular base component is integral with the top wall of the two support components and the top wall of the frontal component, and the top walls thus form an integral top wall.

10. The crane housing according to claim 1, wherein the bottom wall of the annular base component is integral with the bottom wall of the two support components and the bottom wall of the frontal component, and wherein the bulkheads of the annular base component, the two support components and the frontal component are connected to the so formed integral bottom wall.

11. The crane housing according to claim 1, wherein the torsion box, formed by the two support components and the frontal component, is connected to a top section of the annular base component, and the bottom walls of the front component and the support components are connected to the outer wall of the annular base component, and are vertically spaced from the bottom wall of the annular base component.

12. The crane housing according to claim 1, wherein the crane housing is configured to support a crane gantry, the crane gantry comprising a crane gantry compression member and a crane gantry tension member, and is provided with two crane gantry compression member supports, each provided on one of the respective support components at one of the two boom supports, and is provided with two crane gantry tension member supports, each located on a rear segment of the annular base component, and each at a lateral distance from a longitudinal center axis of the crane housing through the slew axis that is smaller than the radius of the annular base component with respect to the slew axis.

13. The crane housing according to claim 1, wherein the two crane gantry tension member supports are located vertically above the rear segment of the annular base component, such that, when seen in a top view, the two crane gantry tension member supports substantially overlap with the annular base component.

14. A leg encircling crane comprising the crane housing according to claim 1, a slew bearing extending about one of the jack-up legs of a jack up vessel, for allowing slew motion of the crane housing of the crane around a vertical slew axis, a crane boom supported at a front of the crane housing, and a crane superstructure.

15. A jack-up vessel comprising jack-up legs, a hull, and the leg encircling crane according to claim 14.

16. A method for handling an object from a jack-up vessel at an offshore location, by using the leg encircling crane according to claim 14, wherein the inner ends of the boom of the crane are both supported on the crane housing of the crane outwardly from the annular base component, and wherein the load of the boom, as applied on the boom supports, subjects the base component via the torsion box to a torsion that is distributed over the front segment of the base component.

17. A crane housing for a leg encircling crane for use on a jack-up vessel comprising horizontally spaced apart jack-up legs, wherein the crane housing is configured to be mounted onto a slew bearing extending about one of the jack-up legs of the jack up vessel, for allowing slew motion of the crane housing of the crane around a vertical slew axis, to pivotally support a crane boom at a front of the crane housing so that the boom is pivotal about a substantially horizontal pivot axis, and to support a crane superstructure at a back of the crane housing, wherein the crane housing is a box-type construction, and the crane housing comprises an annular base component, configured to extend about a jack-up leg of the jack-up vessel, the annular base component having a substantially constant cross section, having an inner circumferential wall and an outer circumferential wall that are circular and concentric, and a top wall and a bottom wall extending between the inner circumferential wall and the outer circumferential wall, and furthermore, the annular base component comprises bulkheads that extend between the inner circumferential wall and the outer circumferential wall, and the top wall, wherein the crane housing is provided with two boom supports, for pivotally supporting two inner ends of the boom of the crane so that said boom is pivotal about a horizontal pivot axis through the two boom supports, wherein the crane housing is configured to support a crane gantry, the crane gantry comprising a crane gantry compression member and a crane gantry tension member, and is provided with two crane gantry compression member supports, each provided at one of the two boom supports, and is provided with two crane gantry tension member supports, each located on a rear segment of the annular base component, wherein the two crane gantry tension member supports are each connected to the annular base component via an A-shaped support frame, the support frames each comprising two support arms that diverge in a direction towards the annular base component, and the support arms being, at a lower end, mounted to the annular base component, wherein the support arms of the A-shaped support frames are box-type elements, the support arms comprising a front wall, a rear wall, an inside wall and an outside wall, wherein, for each of the support arms, for each of the support frames, the front wall has an outside surface that faces towards a lateral center axis of the crane housing through the slew axis, and the rear wall has an outside surface that faces away from the lateral center axis of the crane housing, wherein, for each of the support arms, for each of the support frames, the inside wall has an outside surface that faces towards a longitudinal center axis of the crane housing through the slew axis, and the outside wall has an outside surface that faces away from, and is parallel to, the longitudinal center axis of the crane housing, and wherein, the annular base component comprises bulkheads, each of the support arms being associated with at least one of these bulkheads, the bulkheads being provided in the annular base component at the lower ends of the support arms, each of the bulkheads being with a top end in register with one of the inside walls or outside walls of the support arms, and being perpendicular to the boom pivot axis.

18. The leg encircling crane comprising the crane housing according to claim 17, a slew bearing extending about one of the jack-up legs of a jack up vessel, for allowing slew motion of the crane housing of the crane around a vertical slew axis, a crane boom supported at a front of the crane housing, and a crane superstructure.

19. A jack-up vessel comprising jack-up legs, a hull, and the leg encircling crane according to claim 18.

20. A method for handling an object from a jack-up vessel at an offshore location, by using the leg encircling crane according to claim 18, wherein the inner ends of the boom of the crane are both supported on the crane housing of the crane outwardly from the annular base component, and wherein the load of the boom, as applied on the boom supports, subjects the base component via the torsion box to a torsion that is distributed over the front segment of the base component.

* * * * *